United States Patent [19]

Heckman

[11] 4,248,030
[45] Feb. 3, 1981

[54] METHOD FOR ASSEMBLING PLASTIC SLEEVE PREFORMS AND CONTAINERS

[75] Inventor: Russell W. Heckman, Perrysburg, Ohio

[73] Assignee: Owens-Illinois, Inc., Toledo, Ohio

[21] Appl. No.: 36,204

[22] Filed: May 4, 1979

[51] Int. Cl.³ .................. B65B 21/26; B65B 53/06
[52] U.S. Cl. ........................ 53/397; 53/442;
53/556; 53/585; 53/295; 156/86; 156/423
[58] Field of Search ........... 53/442, 291, 295, 397,
53/585, 556; 156/86, 423, 567; 264/230

[56] References Cited

U.S. PATENT DOCUMENTS

| | | | |
|---|---|---|---|
| 3,959,065 | 5/1976 | Ashcroft | 53/585 X |
| 4,013,496 | 3/1977 | Amberg | 53/291 X |
| 4,102,728 | 7/1978 | Smith | 53/291 X |

*Primary Examiner*—Travis S. McGehee
*Attorney, Agent, or Firm*—E. J. Holler; M. E. Click; D. H. Wilson

[57] ABSTRACT

This invention relates to a method for producing a composite container having a body label or tubular sleeve mounted thereon adapted to be shrunken onto exterior surface areas of a cylindrical container. The tubular sleeve is preformed of thin flexible thermoplastic material and may be flat-folded until ready for use when it is fully opened and conveyed in axial registry with the container inverted therebeneath. The sleeve preform of heat-shrinkable plastic material is telescopically assembled onto the inverted container while the latter is conveyed through a coincidental aligned path. The container preferably consists of a hollow glass or plastic container held invertedly by its neck portion with the tubular preform made slightly larger in diameter to surround the body and neck portions of the container. The tubular sleeve preform is held fully opened and is then transported downwardly in telescopic relation when in axial alignment with the inverted container. The opened sleeve and upright inverted container are continuously moved in synchronism in a coincidental lineal path for such sleeve mounting in temporary relation on the container body and neck where it is adapted to controlled heat-shrinking in place in permanent conforming arrangement.

10 Claims, 10 Drawing Figures

METHOD FOR ASSEMBLING PLASTIC SLEEVE PREFORMS AND CONTAINERS

BACKGROUND OF THE INVENTION

1. Field of the Invention

This invention relates to the manufacture of composite containers and primarily to the assembly of a hollow sleeve preform on the neck and body portions of an inverted container for subsequent shrinking in situ thereon. The sleeve may be formed immediately prior to its application to the container. Alternately, the sleeve may be in preformed, flattened condition and taken to a position immediately above the container where it is fully opened and moved into co-axial alignment with the container held in inverted relation. The tubular sleeve is adapted to being opened and moved horizontally to co-axially align the two components for their telescopic assembly. The sleeve is deposited telescopically on the container body and neck while retained in precise vertical alignment. The final shrinking of the sleeve tightly around the body and neck portions can be performed by many appropriate physical conditions.

2. Description of Prior Art

This invention comprises an improvement over the methods and apparatus disclosed in issued U.S. Pat. Nos. 3,767,496, issued Oct. 23, 1973; 3,802,942 issued Apr. 9, 1974; and 3,959,065 issued May 25, 1976, all of which are commonly owned by the same assignee as the present application. In each of these disclosures, a tubular sleeve is formed which is telescopically assembled onto the article from below by a push-up mechanism. None of these disclosures pertain to a thin flexible sleeve of thermoplastic material which may be stored in flattened, prefabricated condition or fabricated just prior to use and then opened and telescoped downwardly over the inverted container in rapid and efficient assembly during their coincident lineal movement.

In many of the previously-disclosed processes and apparatus for making composite containers having an integral plastic base or sleeve thereon, a manufactured glass bottle or jar is loaded onto a conveyor and preheated prior to mounting the plastic sleeve. The plastic sleeves are carried on an underlying turret to pass into alignment with the bottles and are moved vertically upwardly into telescopic assembly over the lower ends or body portions of the bottles. The sleeves are then carried on the bottles into a heating apparatus such as a tunnel oven wherein appropriate physical conditions shrink the sleeves into close-fitting conforming arrangement over the bottle body surfaces where assembled. The heating apparatus commonly consists of a lengthwise oven through which the bottles are passed, the oven temperatures ranging from about 170° F. to 800° F., depending upon the plastic material selected to comprise the sleeves.

U.S. Pat. No. 3,959,065, owned by the common assignee of this application, discloses method and apparatus which assure against dislocation of the sleeve on the bottle without external handling mechanism being required to hold the sleeve in place between its assembly point with the bottle and the shrinking oven.

The cap sealing of bottles has been conventionally performed in recent years to provide for reasons of sanitation, pilfer-proofing, safety and appearance, the further step of placing over and around the neck of the bottle, as well as preferably over at least part of its closure, a tubular sleeve of heat-contracting synthetic resin material, severed to a prescribed length, and then shrinking the sleeve to conform to the bottle by thermal contraction. The synthetic resin tubing is usually pressed flat and delivered in rolls in many production processes, and since the tubing may or may not stay fully flattened, particularly where it is comprised of extremely flexible and resilient material, inefficiencies can and do result when the severed lengths of tubing are fitted onto the bottle necks. In some cases, to facilitate the fitting of short, flat, tubular sleeves onto the necks of bottles, it has been common practice to preform the sleeves such as by putting perforations or scores along their fold lines. It is also possible to apply the tubes around the bottle necks without preforming the material, as taught by U.S. Pat. No. 3,861,918 to Muto; however, such method normally requires the application of a bonding agent to the bottle neck for firm, permanent adherence of the sleeve. The method and apparatus disclosed by this patent are exceedingly more complex and prone to occasionally misapply a tubular band or label. U.S. Pat. No. 2,852,899 to Murrell discloses a collar feeding mechanism which is designed to remove only the lowermost collar from a nested stack by frictional engagement with its inner surface. The collars are preformed and nested tightly into a stack from which they are deliverable onto the container necks.

Normally when heat-shrinkable thermoplastic sleeves are mounted on containers such as bottles or jars having frustoconical upper portions, with the containers in upright relation for heat-shrinking an all-encompassing tubular sleeve therearound, the upper area of the sleeve when heat-softened tends to slump downwardly due to gravitational forces creating undesirable folds or wrinkles upon its shrinkage at such frusto-conical area. It is to solve this problem that the present invention is primarily directed.

SUMMARY OF THE INVENTION

An object of this invention is to provide a method for positively opening tubular sleeves of thin flexible thermoplastic material and placing the same telescopically over the bottom of inverted containers while both are conveyed in co-axial vertical alignment. The sleeves are preferably comprised of thin film very pliable thermoplastic material and the containers of glass or plastic bottles have cylindrical body and frusto-conical neck portions.

The present invention, as disclosed hereinafter in a specific preferred embodiment, provides a method for applying a preformed, extremely-flexible thin tubular band or sleeve to major exterior surfaces of an inverted container where it is frictionally retained prior to subsequent controlled heat shrinking of the sleeve onto the container surfaces in final conforming relationship. Normally, in the case of glass containers, they are preheated from about 100° F. to 200° F. prior to applying the sleeves. The invention permits downward telescopic assembly of the band or sleeve around the container body and neck portions in a single unitary operation. The sleeves formed of very flexible film or foam material may be formed just prior to use or preformed and stored in flat, folded condition in a stack with an open end lowermost adjacent a rotary turret adapted to engage individual sleeves serially for their full opening. An individual band is fully opened prior to moving same telescopically in a downward direction over the major exposed surfaces of the container held in inverted relation. The band is adapted to temporary retention in place on the container mid-body portion until it is fully heat shrunken into conforming, essentially wrinkle-free permanent relationship thereon.

The method may employ a rotary turret mechanism adapted to form a tubular thermoplastic sleeve thereon and to open same into container-mounting configuration. The rotary turret permits precise axial and vertical alignment of the container body portion and opened sleeve so that the sleeve may be telescoped to an essentially all-encompassing position around the container body.

Another feature of the invention is the opening and downward telescopic movement of a tubular heat-shrinkable plastic sleeve surrounding the container body and neck regions while the container is supported invertedly by its neck region for convenient and economical application of the sleeve onto such containers at production speeds prior to heat shrinking of the sleeve onto the surrounded circumferential body and neck regions. Inversion of the container permits the sleeve to shrink around the neck portion without wrinkling due to a gravity effect.

DESCRIPTION OF PREFERRED EMBODIMENT

Figure 1:
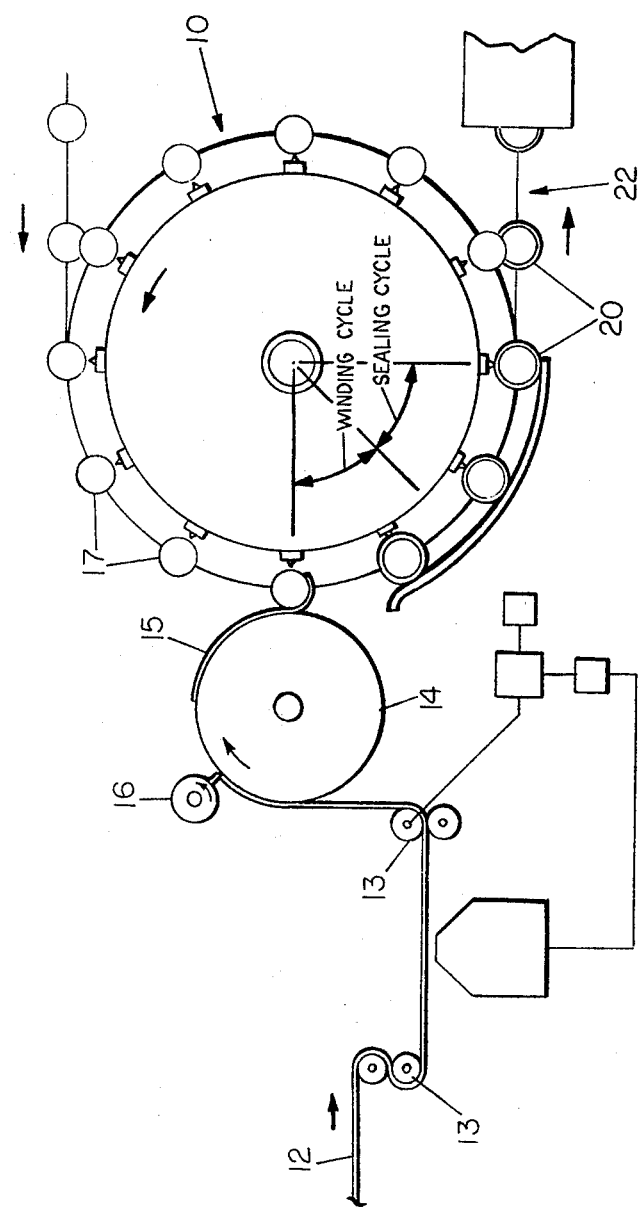
FIG. 1 is a top plan view of one type of sleeve forming mechanism in accordance with the present invention.

As shown in FIG. 1 of the drawings, the apparatus for producing containers with plastic sleeves thereon consists of rotary turret machine 10 which is adapted to fabricate the tubular plastic sleeves immediately prior to their mounting on the containers. The containers 11 preferably consist of rigid, hollow, glass or plastic bottles which preferably are in unfilled condition just after manufacturing.

As shown further in FIG. 1, a web 12 of stock thermoplastic material is delivered through a suitable set of guide rolls 13 onto a feed drum 14 on which the web is severed into individual blanks 15 by a cutter roll 16. The cutter roll operates in tangential relation to the feed drum to sever the blank 15 to a prescribed uniform length. The blanks are each then wrapped on an individual rotatable mandrel 17 which is mounted on a rotary turret 10.

Mandrels 17 are mounted in series in equi-spaced vertical alignment on the rotary turret 10 which is continuously rotated in a counterclockwise direction as shown in FIG. 1. The sleeves are tightly wrapped on the mandrels and their over-lapped ends are joined by fusion-type axial seal. The arcuate movement of the blanks 15 on the rotating mandrels 17 during the winding and sealing cycles are also shown in FIG. 1.

After the tubular sleeves 20 are fully formed having an axial length slightly lesser than the container height, they are ready to be mounted on the container bodies. The sleeves may also be preformed and arranged in flat-folded condition near the container retention conveyor 22 for their opening into tubular form immediately prior to being mounted on individual containers.

After the tubular sleeve 20 is formed on a given mandrel having a diameter slightly greater than the container, it is then taken to be combined with the container 11 into a composite package. The sleeve is moved downwardly from the mandrel 17 by a stripping element onto the container 20 being temporarily retained in open tubular form.

The sleeves may be comprised of thin flexible oriented thermoplastic film such as polyvinyl chloride or polyethylene. The film may have a thickness of from 1½ to 2 mils in the case of polyvinyl chloride for example. Foamed oriented polyethylene having a thickness ranging from 8 to 13 mils or foamed oriented polystyrene having a thickness ranging from 12 to 17 mils may also be used to form the sleeves. The sleeves may vary in thickness from ½ to 20 mils, depending upon selection of the desired thermoplastic material.

As stated, the apparatus as shown schematically in FIG. 1 comprises means for moving the elongated web 12 of flexible sheet-like thermoplastic material in a longitudinal direction with severing means for cutting uniform length blanks. The mechanism for engaging the moving web 12 for carrying it onto the cylindrical surface of the feed drum 14 includes vacuum means connected to the cylindrical surface of the feed drum for holding the web thereon. A rotary knife is provided cooperating with the cylindrical web-carrying surface for cutting the web thereon across its width and severing a sleeve blank length from the web.

Figure 3:
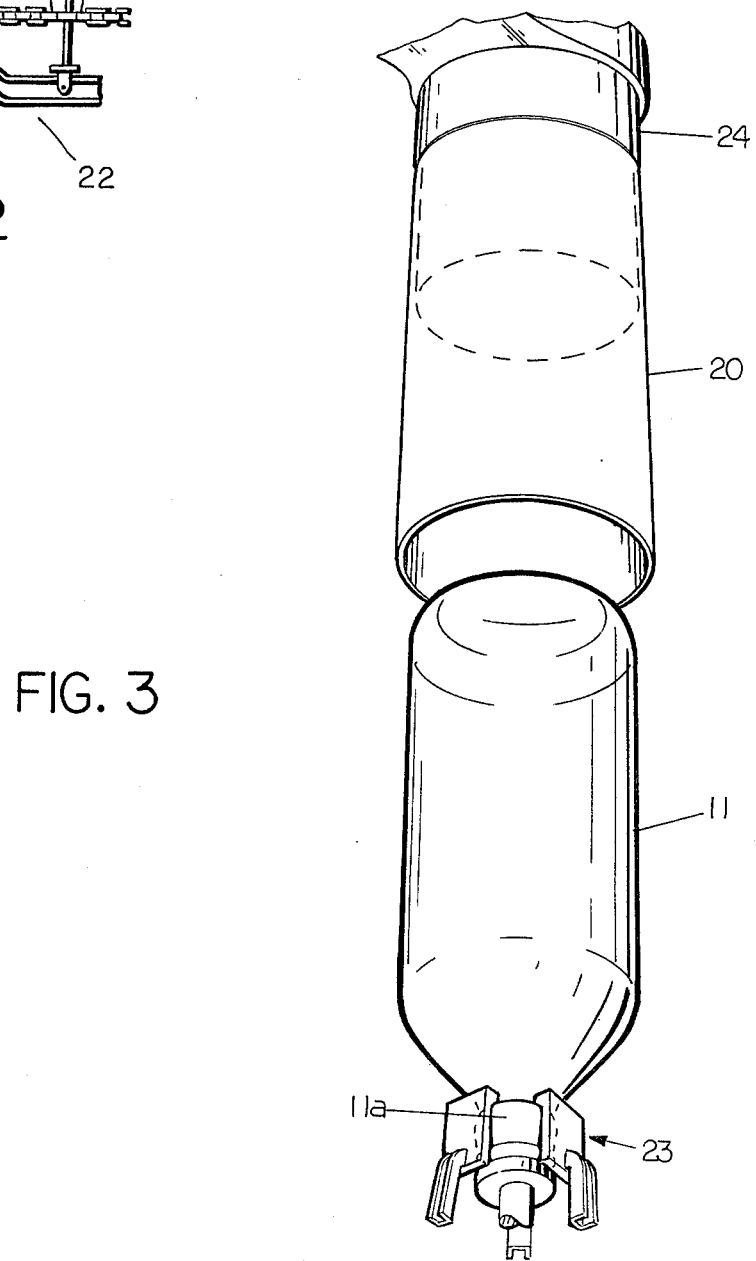
FIG. 3 is an enlarged perspective view of a glass container and sleeve prior to mounting thereon.

The mandrel 17 is provided having a peripheral surface adjacent the cylindrical surface of the web feed drum engageable with the leading portion of the sleeve blank, the peripheral dimension of the mandrel surface being less than the length of the blank. Vacuum means are provided connected to the mandrel surface and operable, in response to engaging the leading portion of the blank, for winding the blank thereon. A heater element is provided operable, in response to wrapping the blank on the mandrel surface, for heating the leading and trailing end portions of the blank prior to overlapping the end portions on the mandrel. The heated end portions overlapping one another on the mandrel surface are contacted by a pressure bar or roll, thereby forming the blank into a hollow sleeve. A stripper element 24, as shown in FIGS. 3 and 4, is provided in association with the mandrel and is operable for axially stripping the newly-formed sleeve 20 from the mandrel.

Figure 2:
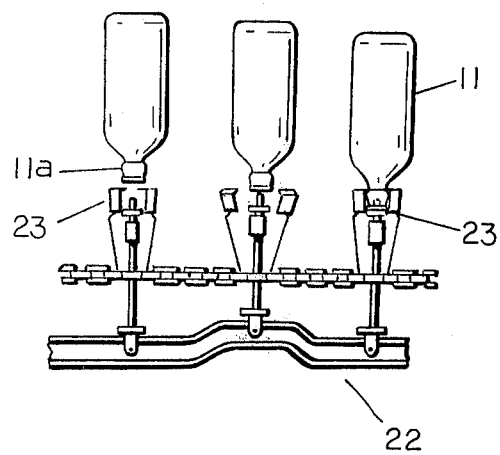
FIG. 2 is a side elevational view of glass containers being conveyed invertedly.

FIG. 2 illustrates in part a container retention conveyor 22 which has a lineal reach extending in tangential alignment to sleeve-forming rotary turret 10. The conveyor has a spaced-apart series of container chucking members 23 located throughout its endless length adapted to grasp and retain the neck portion 11a of a container held in inverted relation beneath turret 10. The plurality of jaw elements of each chuck is adapted to being cammed open and closed by suitable camming means located along the conveyor path. The sleeve 20 is moved downwardly by the stripper element 24, mounted on the turret 10, to lower the newly-formed sleeve 20 over the container 11 in vertical and axial alignment therewith. Such alignment is shown in FIG. 3. It is preferred to preheat the container just prior to application of the sleeve, preferably to a temperature of from about 100° F. to 200° F. in the case of glass bottles.

Figure 4:
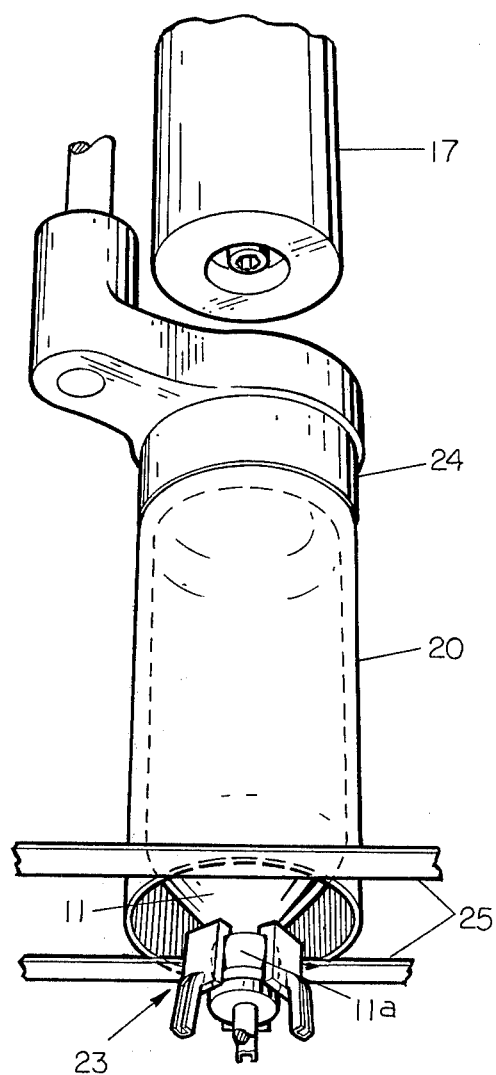
FIG. 4 is a view similar to FIG. 3 with the sleeve mounted surrounding the glass container.

The sleeve is thus moved telescopically downwardly as shown in FIG. 4 to surround the container in closely-fitting loose relation. The lower extremity of the sleeve is retained in vertical alignment with respect to the container by a pair of horizontally extending stop rails 25 as shown in FIG. 4. The lower edge of the sleeve is stopped short of the chucking mechanism to permit its uniform shrinkage around the container neck region close to the container finish.

Figure 5:
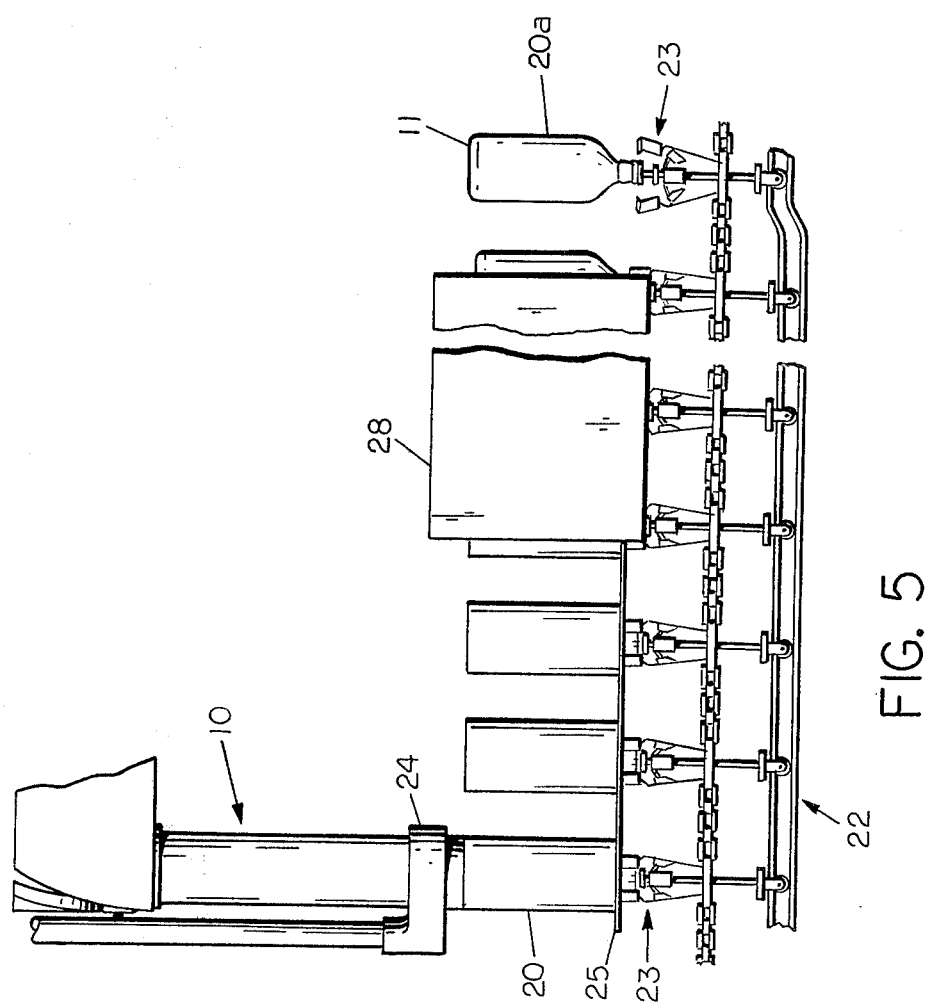
FIG. 5 is a fragmentary side elevational view of a tunnel oven for heat-shrinking the sleeves onto the glass containers.

As shown in FIG. 5, the containers 11 each retained in inverted position and held by their neck with a tubular sleeve therearound are moved horizontally into a tunnel oven 28. The oven extends horizontally a sufficient distance to permit controlled heat shrinking of the sleeves onto the containers. The neck retention chucks 23 are rotated to rotate the containers 11 and their retained sleeves 20 during passage through the tunnel oven.

Figure 6:
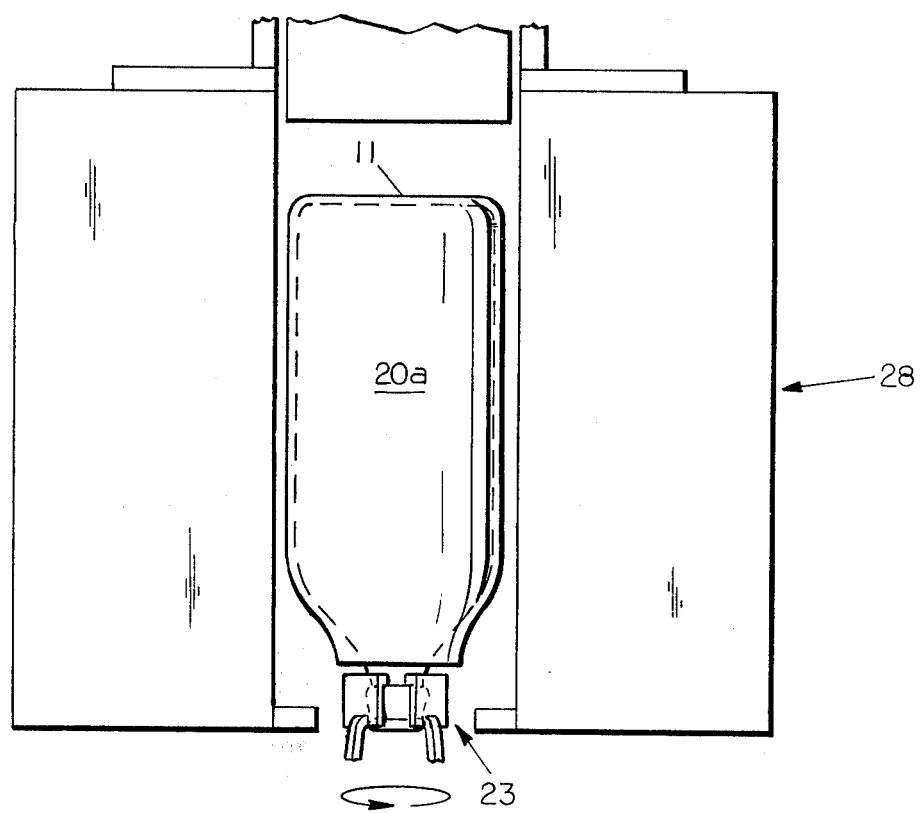
FIG. 6 is an enlarged fragmentary elevational view of a sleeve being heat-shrunk onto a glass container.

Upon entry into the oven, the hot air flow is directed from the sides toward the mid-point region of the sleeve to tack the sleeve to the container mid-body portion. After such tacking, the stop rail 25 is ended within the oven so that the sleeve is retained by the annular tacked area. Such tacking prevents vertical movement of the sleeve with respect to the container. At this time, the sleeve extends downwardly surrounding the neck and shoulder region in spaced-apart relation. During further passage of the container and sleeve through the tunnel oven, the hot air flow is directed against the upper and lower portions of the sleeve surrounding the heel and neck areas of the containers, respectively. The sleeve 20a begins to assume the full exterior configuration of the container as shown in FIG. 6, except for the center of the container bottom and the neck finish held in the container chuck 23.

Figure 7:
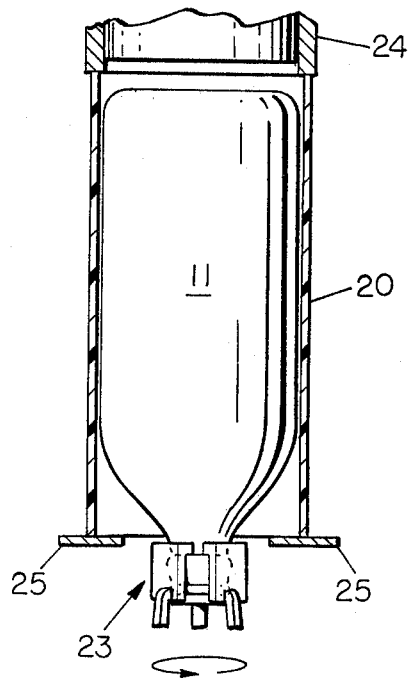
FIG. 7 is an enlarged side elevational view of the sleeve and container upon initial telescopis assembly of the same.
Figure 8:
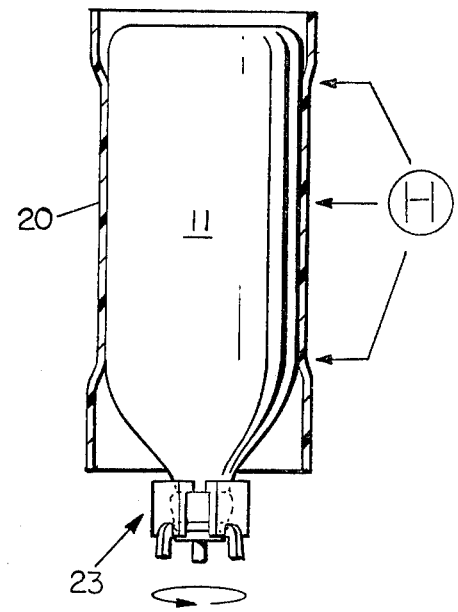
FIG. 8 is a view similar to FIG. 7 showing initial heating of the sleeve at a mid-point region.

FIG. 7 shows the sleeve held at its bottom edge by stop rails 25 during container rotation upon its entry into the oven. At this time, the sleeve loosely surrounds the full vertical extent of the container except for the retained neck finish. FIG. 8 shows the hot air stream being directed at the sleeve center region to tack the sleeve against the container mid-body portion during continuing rotation of container and sleeve. Such tacking is preferably performed from a central annular region upwardly and downwardly to effect heat-shrinkage of the extensive central region as illustrated in FIG. 8.

Figure 9:
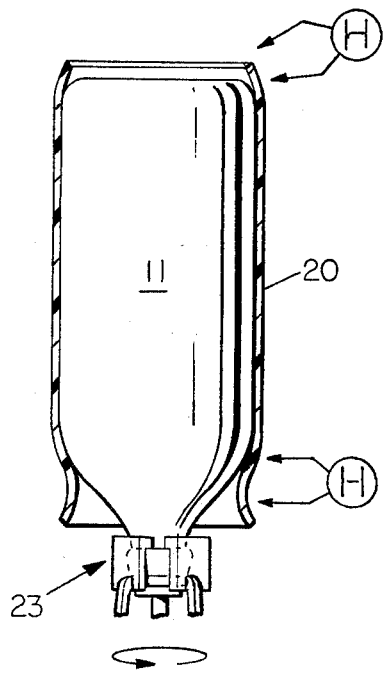
FIG. 9 is a view similar to FIG. 7 showing further heating of the sleeve.
Figure 10:
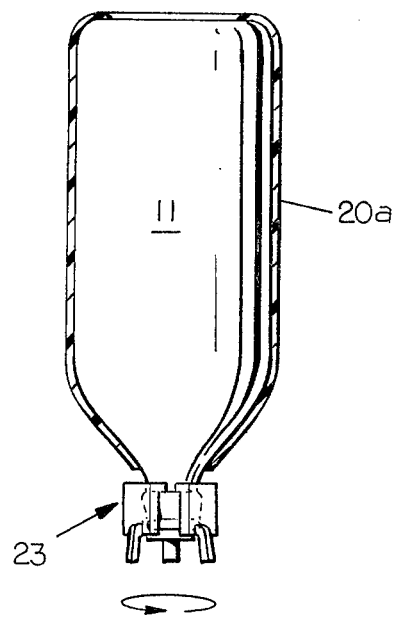
FIG. 10 is a view similar to FIG. 7 showing the sleeve in fully heat-shrunk condition on the container.

FIG. 9 shows the further application of heat to the upper and lower extremities of the sleeve to cause the sleeve to contract around the heel and frusto-conical neck regions of the container. With the sleeve hanging downwardly around the neck, it is able to be fully heat softened to shrink a considerable lateral distance to smoothly and progressively cover the neck area. The sleeve 20a when heat shrunk in this manner is wrinkle-free and smoothly adhered to the container surface therebeneath is snug conforming relation as shown in FIG. 10.

The aforesaid procedures for heat-shrinking the sleeve onto the container provides an improved labeled container having unique properties. The container is able to be fully surface-covered as desired such as where a thin very flexible thermoplastic material is employed. The use of thin oriented polyvinyl chloride material having a thickness of about 1 to 1½ mils is permitted and which smoothly covers the neck area without distortion or roughness.

Various modifications of the present invention may be resorted to within the spirit and scope of the appended claims.

I claim:
1. The method of labeling a container having a base, a first body portion adjacent the base having an exterior surface of predetermined circumference and a second body portion extending from said first body portion having an exterior circumference less than said predetermined exterior circumference of said first body portion, said method comprising the steps of providing a preformed, tubular sleeve of preprinted, heat-shrinkable, organic, thermoplastic, thin film material having a circumference slightly greater than the predetermined exterior circumference of said first body portion of said container, opening said sleeve into open tubular arrangement, retaining the container in an inverted position, transporting the said container and sleeve in vertically-aligned relation with said open sleeve retained over said container, telescoping said sleeve downwardly over the exterior surfaces of said body portions of said inverted container, and heating said sleeve to shrink it into snug essentially wrinkle-free engagement with said exterior surfaces of said body portions therebeneath.

2. The method in accordance with claim 1, wherein said container comprises a glass bottle having a neck portion, and retaining said bottle in inverted vertical relation by firm retention of its neck portion.

3. The method in accordance with claim 1, wherein said container comprises a plastic bottle, and retaining said bottle in inverted vertical relation by firm retention of its neck portion.

4. The method in accordance with claim 2, wherein said tubular sleeve has an axial dimension approximating that of the container body and neck portion for shrinkage around such major exterior surface areas.

5. The method in accordance with claim 2, wherein said tubular sleeve has a length slightly less than the glass bottle height dimension.

6. The method in accordance with claim 1, wherein said sleeve is initially heated annularly in a mid-point region to partially heat-shrink and adhere said sleeve to the container mid-body portion prior to heating remaining portions of said sleeve for complete heat-shrinkage around said container external surfaces.

7. The method of labeling containers such as glass or plastic bottles, and the like, comprising the steps of providing a preformed tubular sleeve of preprinted heat-shrinkable organic thermoplastic thin film material, opening said sleeve into substantially fully open tubular arrangement, retaining the said container in an inverted vertical position by grasping the lowermost mouth portion of said container, transporting the said container and said sleeve simultaneously in vertically-aligned relation with said sleeve retained over said container during their simultaneous movement in co-axial alignment, telescoping said sleeve downwardly over the body and neck portions of said inverted container to surround its major exterior surface areas, said sleeve having a diameter slightly greater than said container diameter and a length slightly lesser than the container height dimension, and heat shrinking said sleeve snugly around said body and neck portions in essentially wrinkle-free condition.

8. The method in accordance with claim 7, wherein said container comprises a cylindrical glass bottle and said sleeve comprises a foamed oriented polyethylene material having its major orientation in a circumferential direction.

9. The method in accordance with claim 7, wherein said sleeve is provided in preformed flat-folded arrangement prior to said opening.

10. The method of labeling a bottle having a cylindrical body portion and frusto-conical neck portion comprising the steps of providing a preformed, tubular sleeve of preprinted, heat-shrinkable, organic, thermoplastic, thin film material having a diameter slightly greater than the body portion of said bottle, opening said sleeve into open tubular arrangement, retaining the bottle by its neck portion in an inverted position, transporting the said bottle and sleeve in vertically aligned relation with said open sleeve retained over said bottle, telescoping said sleeve downwardly over said body and neck portions of said inverted bottle, and heating said sleeve to shrink it into snug essentially wrinkle-free engagement with the exterior surfaces of said body and neck portions of said plastic bottle.

* * * * *